(12) United States Patent
Goyette et al.

(10) Patent No.: US 12,146,416 B2
(45) Date of Patent: Nov. 19, 2024

(54) PROPULSOR BLADE IMAGING ASSEMBLY FOR AN AIRCRAFT PROPULSION SYSTEM

(71) Applicant: Raytheon Technologies Corporation, Farmington, CT (US)

(72) Inventors: Scott Goyette, Moosup, CT (US); Gregory S. Hagen, Glastonbury, CT (US); Zaffir A. Chaudhry, South Glastonbury, CT (US); Paul Attridge, Colchester, CT (US); Janet Shaw, Tolland, CT (US); David L. Lincoln, Cromwell, CT (US); Jeffrey P. King, Coventry, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/136,115

(22) Filed: Apr. 18, 2023

(65) Prior Publication Data
US 2024/0352867 A1 Oct. 24, 2024

(51) Int. Cl.
*F01D 21/00* (2006.01)
*H04N 7/18* (2006.01)
*H04N 23/90* (2023.01)

(52) U.S. Cl.
CPC ........... *F01D 21/003* (2013.01); *H04N 7/188* (2013.01); *H04N 23/90* (2023.01); *F05D 2260/83* (2013.01)

(58) Field of Classification Search
CPC ...... F01D 21/003; H04N 7/188; H04N 23/90; F05D 2260/83
USPC ........................................................ 415/118
See application file for complete search history.

(56) References Cited

U.S. PATENT DOCUMENTS

| | | | |
|---|---|---|---|
| 7,656,445 B2 | 2/2010 | Heyworth | |
| 10,605,165 B2 | 3/2020 | Abe | |
| 2001/0015751 A1* | 8/2001 | Geng | H04N 23/58 348/36 |
| 2005/0270519 A1* | 12/2005 | Twerdochlib | G01P 3/488 356/24 |
| 2007/0085904 A1* | 4/2007 | Heyworth | G01B 11/16 348/82 |
| 2008/0310804 A1* | 12/2008 | Brummel | F23N 5/082 385/115 |

(Continued)

OTHER PUBLICATIONS

EP Search Report for EP Patent Application No. 24171080.5 dated Jul. 30, 2024.

*Primary Examiner* — J. Todd Newton
(74) *Attorney, Agent, or Firm* — Getz Balich LLC

(57) ABSTRACT

An assembly for an aircraft propulsion system includes a propulsor and an imaging assembly. The propulsor includes a propulsor disk, a plurality of propulsor blades, and a nose cone. The plurality of propulsor blades are circumferentially distributed about the propulsor disk. Each propulsor blade of the plurality of propulsor blades extends radially between and to a root end and a tip end. The root end is disposed at the propulsor disk. The propulsor disk and the plurality of propulsor blades are configured to rotate about the rotational axis. The nose cone is disposed axially adjacent the propulsor disk. The imaging assembly includes an imaging device disposed on the nose cone. The imaging device includes a camera. The camera is configured to capture image data of each propulsor blade of the plurality of propulsor blades as the plurality of propulsor blades rotate about the rotational axis.

16 Claims, 4 Drawing Sheets

(56) References Cited

U.S. PATENT DOCUMENTS

2016/0011078 A1* 1/2016 Ruhge .................. G01N 21/954
                                                          73/112.01
2017/0318220 A1* 11/2017 Miller .................... B64D 33/02
2020/0056501 A1   2/2020 Eastment
2021/0180466 A1*  6/2021 Gavrilovski ............ G01S 17/04

* cited by examiner

PROPULSOR BLADE IMAGING ASSEMBLY FOR AN AIRCRAFT PROPULSION SYSTEM

BACKGROUND

1. Technical Field

The present disclosure relates to aircraft propulsion systems and, more particularly, to imaging assemblies for in situ inspection of propulsor blades for aircraft propulsion systems.

2. Background Information

Propulsion systems for aircraft may include rotational equipment, such as propulsors or other rotational equipment components, which may be susceptible to foreign object damage (FOD). Various systems and methods for inspecting rotational equipment components for FOD are known in the art. While these known systems and methods have various advantages, there is still room in the art for improvement. There is a need in the art, therefore, for improved systems and methods for identifying damage to propulsors and other rotational equipment for aircraft propulsion systems.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes a propulsor and an imaging assembly. The propulsor includes a propulsor disk, a plurality of propulsor blades, and a nose cone. The propulsor disk extends circumferentially about a rotational axis. The plurality of propulsor blades are circumferentially distributed about the propulsor disk. Each propulsor blade of the plurality of propulsor blades extends radially between and to a root end and a tip end. The root end is disposed at the propulsor disk. The propulsor disk and the plurality of propulsor blades are configured to rotate about the rotational axis. The nose cone is disposed axially adjacent the propulsor disk. The imaging assembly includes an imaging device disposed on the nose cone. The imaging device includes a camera. The camera is configured to capture image data of each propulsor blade of the plurality of propulsor blades as the plurality of propulsor blades rotate about the rotational axis.

In any of the aspects or embodiments described above and herein, the nose cone may be rotationally fixed relative to the rotational axis.

In any of the aspects or embodiments described above and herein, the nose cone may extend axially between and to a leading end and a trailing end. The trailing end may be positioned at the propulsor disk. The nose cone may form an exterior surface extending between and to the leading end and the trailing end. The camera may be positioned at the exterior surface.

In any of the aspects or embodiments described above and herein, the nose cone may be positioned axially between and spaced from the leading end and the trailing end.

In any of the aspects or embodiments described above and herein, the exterior surface may diverge in a radial direction from the leading end to the trailing end, and divergence of the exterior surface axially between the imaging device and the trailing end may be linear.

In any of the aspects or embodiments described above and herein, the camera may be configured to capture the image data for a portion of a radial span of each propulsor blade of the plurality of propulsor blades.

In any of the aspects or embodiments described above and herein, the portion may be at the root end.

In any of the aspects or embodiments described above and herein, the imaging device may include a plurality of cameras. The plurality of cameras may include the camera. Each camera of the plurality of cameras may be configured to capture the image data for a different portion of the radial span relative to each other camera of the plurality of cameras.

In any of the aspects or embodiments described above and herein, the imaging assembly may further include a controller connected in signal communication with the imaging device. The controller may include a processor in communication with a non-transitory memory storing instructions, which instructions when executed by the processor, may cause the processor to: initiate the capture of the image data by controlling the camera to capture the image data based on a measured rotation speed of the propulsor about the rotational axis.

In any of the aspects or embodiments described above and herein, the instructions, when executed by the processor, may further cause the processor to initiate the capture of the image data by controlling the camera to capture the image data based on the measured rotation speed when the measured rotation speed is less than or equal to a predetermined rotation speed threshold value.

In any of the aspects or embodiments described above and herein, the predetermined rotation speed threshold value may be greater than zero (0) RPM.

In any of the aspects or embodiments described above and herein, the instructions, when executed by the processor, may further cause the processor to identify a presence or an absence of damage for each propulsor blade of the plurality of propulsor blades using the image data.

In any of the aspects or embodiments described above and herein, the instructions, when executed by the processor, may further cause the processor to transmit to an offboard system an indication of identification of the presence of damage to at least one propulsor blade of the plurality of propulsor blades.

According to another aspect of the present disclosure, a method for inspection of a plurality of propulsor blades for an aircraft propulsion system is provided. The method includes rotating the plurality of propulsor blades about a rotational axis at a first rotation speed, shutting down the aircraft propulsion system, capturing image data for each propulsor blade of the plurality of propulsor blades for the shutdown aircraft propulsion system subsequent to rotation speed of the plurality of propulsor blades decreasing to or below a second rotation speed which is less than the first rotation speed and greater than zero (0) RPM, and identifying a presence or an absence of damage for each propulsor blade of the plurality of propulsor blades using the captured image data.

In any of the aspects or embodiments described above and herein, capturing the image data for each propulsor blade of the plurality of propulsor blades may include capturing the image data for each propulsor blade of the plurality of propulsor blades with a camera disposed at a propulsor nose cone axially adjacent the plurality of propulsor blades. The propulsor nose cone may be rotationally fixed relative to the rotational axis.

In any of the aspects or embodiments described above and herein, shutting down the aircraft propulsion system may be performed with the aircraft propulsion system in a grounded condition.

According to an aspect of the present disclosure, a propulsion system for an aircraft includes a gas turbine engine and an imaging assembly. The gas turbine engine includes a rotational assembly and a propulsor. The rotational assembly includes a shaft rotatable about a rotational axis. The propulsor includes a plurality of propulsor blades and a nose cone. The plurality of propulsor blades is configured to be driven by the shaft for rotation about the rotational axis. The nose cone is rotationally fixed relative to the rotational axis. The imaging assembly includes an imaging device disposed on the nose cone. The imaging device includes a camera. The camera is configured to capture image data of each propulsor blade of the plurality of propulsor blades as the propulsor blades rotate about the rotational axis.

In any of the aspects or embodiments described above and herein, the imaging assembly may further include a controller connected in signal communication with the imaging device. The controller may include a processor in communication with a non-transitory memory storing instructions, which instructions when executed by the processor, may cause the processor to: initiate the capture of the image data by controlling the camera to capture the image data based on a rotation speed of the shaft about the rotational axis.

In any of the aspects or embodiments described above and herein, the imaging assembly may further include a shaft speed sensor configured to measure the rotation speed of the shaft, generate an output signal proportional to the measured rotation speed, and transmit the output signal to the controller.

In any of the aspects or embodiments described above and herein, the gas turbine engine may further include a generator. The generator may be configured to generate and direct electrical power to the imaging assembly.

The present disclosure, and all its aspects, embodiments and advantages associated therewith will become more readily apparent in view of the detailed description provided below, including the accompanying drawings.

DETAILED DESCRIPTION

Figure 1:
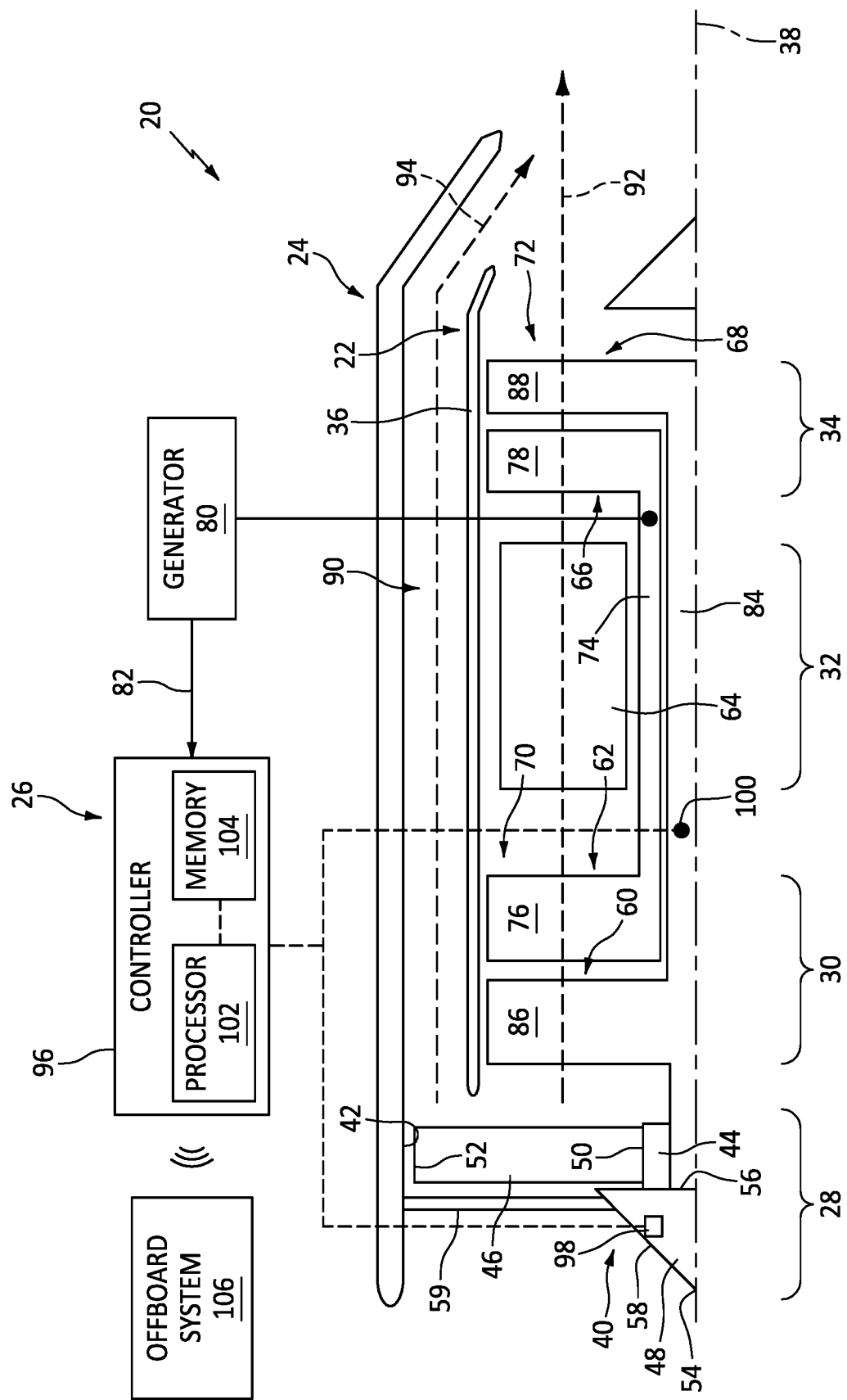
FIG. 1 illustrates a schematic side, cutaway view of an aircraft propulsion system, in accordance with one or more embodiments of the present disclosure.

FIG. 1 schematically illustrates a side, cutaway view of a propulsion system 20 configured for an aircraft. The aircraft propulsion system 20 of FIG. 1 includes a gas turbine engine 22, a nacelle 24, and an imaging assembly 26.

The gas turbine engine 22 of FIG. 1 is configured as a multi-spool turbofan gas turbine engine. The gas turbine engine 22 of FIG. 1 includes a propulsor section 28, a compressor section 30, a combustor section 32, a turbine section 34, and an engine static structure 36. The present disclosure, however, is not limited to the particular gas turbine engine 22 configuration of FIG. 1. For example, aspects of the present disclosure may also be applicable to propulsion system gas turbine engines having single-spool and three-spool configurations.

The gas turbine engine 22 sections 28, 30, 32, and 34, of FIG. 1 are arranged sequentially along an axial centerline 38 (e.g., a rotational axis) of the gas turbine engine 22. The engine static structure 36 may include, for example, one or more engine cases for the gas turbine engine 22. The engine static structure 36 may additionally include cowlings, bearing assemblies, or other structural components of the gas turbine engine 22. The engine static structure 36 and its components house, structurally support, and/or rotationally support components of the engine sections 28, 30, 32, and 34.

The propulsor section 28 includes a propulsor 40 (e.g., a fan, an open rotor propulsor, etc.) The propulsor section 28 may additionally include a propulsor case 42 (e.g., a fan case). The propulsor 40 includes a propulsor disk 44, a plurality of propulsor blades 46, and a nose cone 48. The propulsor disk 44 is configured as an annular body. For example, the propulsor disk 44 extends circumferentially about (e.g., completely around) the axial centerline 38. Each of the plurality of propulsor blades 46 includes a root end 50 and a tip end 52. The root end 50 is mounted to the propulsor disk 44. Each of the plurality of propulsor blades 46 extends radially outward from the root end 50 to the tip end 52. The plurality of propulsor blades 46 are circumferentially distributed about the propulsor disk 44. The nose cone 48 forms an aerodynamic structure of the propulsor 40 axially adjacent the propulsor disk 44. For example, the nose cone 48 may be disposed upstream of (e.g., axially forward of) the propulsor disk 44. The nose cone 48 extends (e.g., axially extends) between and to a leading end 54 of the nose cone 48 and a trailing end 56 of the nose cone 48. The leading end 54 is disposed upstream of (e.g., axially forward of) the trailing end 56. The trailing end 56 is disposed at (e.g., on, adjacent, or proximate) the propulsor disk 44. The nose cone 48 forms an exterior surface 58 extending between and to the leading end 54 and the trailing end 56. The exterior surface 58 is configured with a conical shape which radially diverges in a direction from the leading end 54 to the trailing end 56. The nose cone 48 of FIG. 1 is rotationally fixed relative to the propulsor disk 44. In other words, the propulsor disk 44 and the plurality of propulsor blades 46 may rotate about the axial centerline 38 while the nose cone 48 remains rotationally fixed relative to the axial centerline 38. The propulsor 40 may include one or more struts 59, vanes, or other structural components for supporting the nose cone 48 (e.g., for mounting the nose cone 48 to the propulsor case 42); however, the present disclosure is not limited to any particular mounting configuration for the nose cone 48. The propulsor case 42 extends circumferentially about (e.g., completely around) the axial centerline 38. The propulsor case 42 radially circumscribes the plurality of propulsor blades 46. The propulsor case 42 may be formed by or otherwise disposed at the nacelle 24.

The compressor section 30 may include a low-pressure compressor (LPC) 60 and a high-pressure compressor (HPC) 62. The combustor section 32 includes a combustor 64 (e.g., an annular combustor) forming a combustion chamber. The turbine section 34 may include a high-pressure turbine (HPT) 66 a low-pressure turbine (LPT) 68.

The gas turbine engine 22 sections 28, 30, 32, 34 form a first rotational assembly 70 (e.g., a high-pressure spool) and a second rotational assembly 72 (e.g., a low-pressure spool) of the gas turbine engine 22. The first rotational assembly 70 and the second rotational assembly 72 of FIG. 1 are mounted for rotation about the axial centerline 38 relative to the engine static structure 36. Alternatively, the first rotational assembly 70 and the second rotational assembly 72 may each be mounted for rotation about different respective rotational axes.

The first rotational assembly 70 includes a first shaft 74, a bladed first compressor rotor 76 for the high-pressure compressor 62, and a bladed first turbine rotor 78 for the high-pressure turbine 66. The first shaft 74 interconnects the bladed first compressor rotor 76 and the bladed first turbine rotor 78. The first rotational assembly 70 may further include one or more engine accessories connected in rotational communication with the first shaft 74. For example, the first rotational assembly 70 of FIG. 1 includes a generator 80 connected in rotational communication with the first shaft 74. The generator 80 may be directly mechanically coupled to the first shaft 74. Alternatively, the generator 80 may be indirectly mechanically coupled to the first shaft 74, for example, by an accessory gear assembly (not shown) configured to rotationally drive the generator 80 at a reduced rotational speed relative to the first shaft 74. Rotation of the first shaft 74 drives rotation of the generator 80 causing the generator 80 to generate electrical power for electrical loads (e.g., electronic control systems, electric motors, lighting systems, etc.) of the propulsion system 20 and/or an aircraft on which the propulsion system 20 is installed. For example, the generator 80 may direct electrical power 82 to all or a portion of the imaging assembly 26. While engine accessories, such as the generator 80, are described above as components of the first rotational assembly 70, the engine accessories (e.g., the generator 80) may alternatively be components of the second rotational assembly 72 and may be mechanically coupled to and driven by the second rotational assembly 72 in a similar manner.

The second rotational assembly 72 includes a second shaft 84, a bladed second compressor rotor 86 for the low-pressure compressor 60, and a bladed second turbine rotor 88 for the low-pressure turbine 68. The second shaft 84 interconnects the bladed second compressor rotor 86 and the bladed second turbine rotor 88. The second shaft 84 may be directly or indirectly connected to the propulsor 40 (e.g., the propulsor disk 44) to drive rotation of the propulsor 40. For example, the second shaft 84 may be connected to the propulsor 40 by one or more speed-reducing gear assemblies (not shown) to drive the propulsor 40 at a reduced rotational speed relative to the second shaft 84.

The nacelle 24 forms an exterior aerodynamic housing for the propulsion system 20. The nacelle 24 of FIG. 1 extends circumferentially about (e.g., completely around) the axial centerline 38 and surrounds the gas turbine engine 22. The nacelle 24 surrounds and forms an annular bypass duct 90 between (e.g., radially between) the nacelle 24 and the engine static structure 36 (e.g., a core cowling).

During operation of the gas turbine engine 22 of FIG. 1, ambient air enters the gas turbine engine 22 through the propulsor section 28 and is directed into a core flow path 92 and a bypass flow path 94 by rotation of the propulsor 40. The core flow path 92 extends generally axially along the axial centerline 38 in the gas turbine engine 22. For example, the core flow path 92 extends axially through the gas turbine engine 22 sections 30, 32, and 34 of FIG. 1. The air in the core flow path 92 may be referred to as "core air." The core air is compressed by the bladed second compressor rotor 86 and the bladed first compressor rotor 76 and directed into the combustion chamber of the combustor 64. Fuel is injected into the combustion chamber and mixed with the compressed core air to form a fuel-air mixture. This fuel-air mixture is ignited and combustion products thereof, which may be referred to as "core combustion gas," flow through and sequentially cause the bladed first turbine rotor 78 and the bladed second turbine rotor 88 to rotate. The rotation of the bladed first turbine rotor 78 and the bladed second turbine rotor 88 respectively drive rotation of the first rotational assembly 70 and the second rotational assembly 72. Rotation of the second rotational assembly 72 further drives rotation of the propulsor 40, as discussed above. The air in the bypass flow path 90 is directed through the bypass duct 90. The air in the bypass flow path 90 may be referred to as "bypass air."

The imaging assembly 26 of FIG. 1 includes a controller 96 and one or more imaging devices 98. The imaging assembly 26 may additionally include a shaft speed sensor 100.

The controller 96 is connected in signal communication with the imaging device(s) 98 to perform the functions described herein. The controller 96 includes a processor 102 and memory 104. The memory 104 is connected in signal communication with the processor 102. The processor 102 may include any type of computing device, computational circuit, processor(s), CPU, computer, or the like capable of executing a series of instructions that are stored in the memory 104. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the imaging assembly 26 to accomplish the same algorithmically and/or by coordination of imaging assembly 26 components. The memory 104 may include a single memory device or a plurality of memory devices, for example, a computer-readable storage device that can be read, written, or otherwise accessed by a general purpose or special purpose computing device, including any processing electronics, and/or processing circuitry capable of executing instructions. The present disclosure is not limited to any particular type of configuration for the memory 104, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory 104 may be directly or indirectly electronically integrated with the controller 96. The controller 96 may include, or may be in communication with, an input device that enables a user to enter data and/or instructions, and may include, or be in communication with, an output device configured, for example to display information (e.g., a visual display or a printer), or to transfer data, etc. Communications between the controller 96 and other components, such as other components of the imaging assembly 26, may be via a hardwire connection or via a wireless connection. A person of skill in the art will recognize that portions of the controller 96 may assume various forms (e.g., digital signal processor, analog device, etc.) capable of performing the functions described herein.

The controller 96 may form or otherwise be part of an electronic engine controller (EEC) for the gas turbine engine 22. The EEC may control operating parameters of the gas turbine engine 22 including, but not limited to, fuel flow to the combustor 64, stator vane position (e.g., variable compressor inlet guide vane (IGV) position), compressor air bleed valve position, etc. so as to control an engine power and/or thrust of the gas turbine engine 22. In some embodiments, the EEC may be part of a full authority digital engine control (FADEC) system for the gas turbine engine 22.

The shaft speed sensor 100 may be connected in signal communication with the controller 96, as shown in FIG. 1. The shaft speed sensor 100 of FIG. 1 is positioned at (e.g., on, adjacent, or proximate) the second shaft 84. The shaft speed sensor 100 is configured to measure a rotation speed of the second rotational assembly 72 (e.g., the second shaft 84) and generate an output signal proportional to the measured rotation speed.

The controller 96 may be configured for wireless communication with one or more offboard systems 106 (e.g., an electronic system which is external to both the propulsion system 20 and an aircraft on which the propulsion system 20 is installed). As will be discussed in further detail, the controller 96 may transmit image data and/or other operational data collected from the propulsion system 20 (e.g., from the imaging device 98) to the offboard system(s) 106 for remote monitoring and/or analysis of propulsion system 20 health. For example, the offboard system(s) 106 may allow maintenance personnel to remotely monitor and/or analyze the health of the propulsion system 20 (e.g., the plurality of propulsor blades 46). The offboard system(s) 106 may include, for example, a ground station, a near-wing maintenance computer, and/or any other device with which the controller 96 may establish one-way or two-way wireless communication. Wireless communication may be implemented by a variety of technologies such as, but not limited to, Wi-Fi (e.g., radio wireless local area networking based on IEEE 802.11 or other applicable standards), cellular networks, satellite communication, and/or other wireless communication technologies known in the art. Wireless communication between the controller 96 and the offboard system(s) 106 may be direct or indirect. For example, the controller 96 may directly wirelessly communicate with the offboard system(s) 106. Alternatively, for example, the controller 96 may indirectly wirelessly communicate with the offboard system(s) 106 using one or more intermediate systems or components (e.g., communication systems) of the propulsion system 20 and/or an aircraft on which the propulsion system 20 is installed. It should be understood, of course, that wired communication systems may be used in addition to or as an alternative to wireless communication systems.

Figure 2:
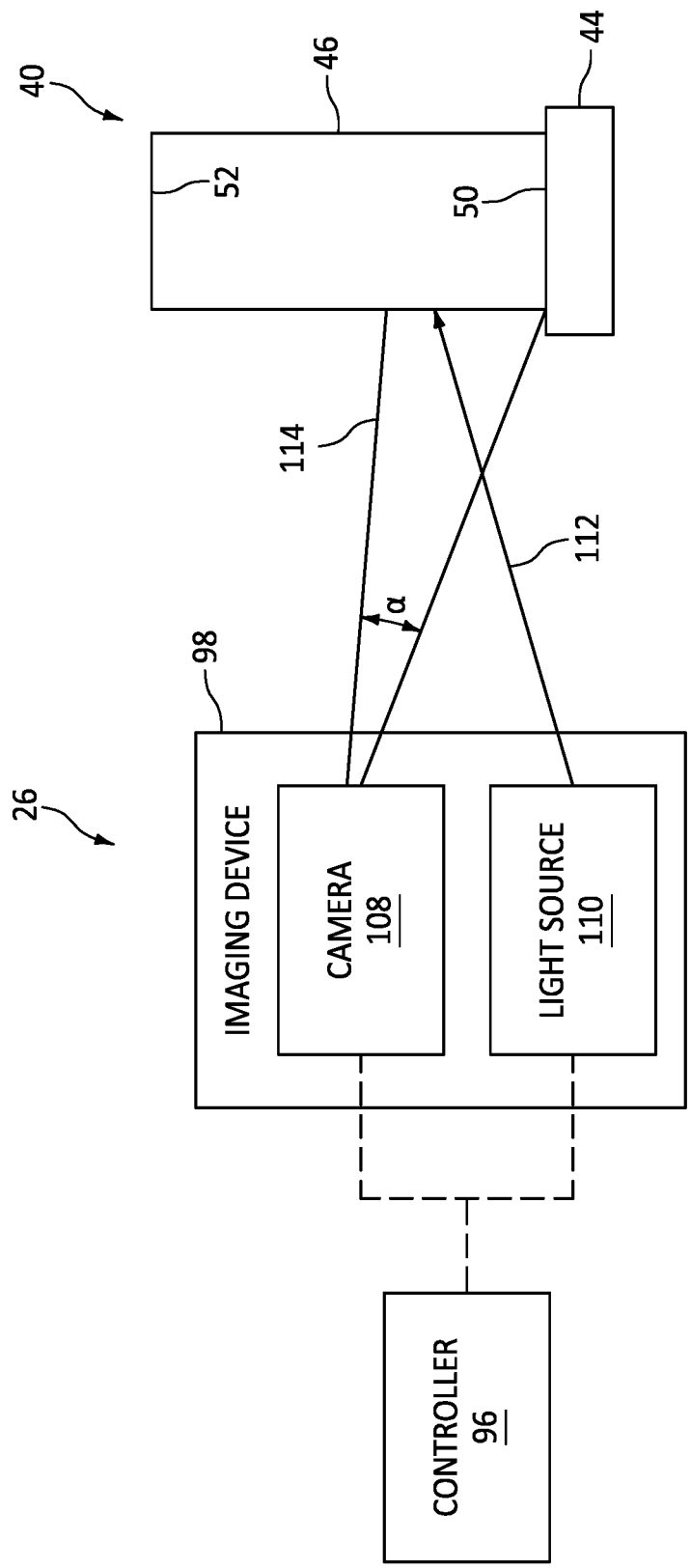
FIG. 2 illustrates a block diagram of a propulsor blade imaging assembly for an aircraft propulsion system, in accordance with one or more embodiments of the present disclosure.

Referring to FIGS. 1 and 2, the imaging device 98 will be described in further detail. The imaging device 98 of FIG. 1 is installed on the nose cone 48. FIG. 2 illustrates a block diagram including the imaging device 98, the controller 96, and the propulsor 40. The imaging device 98 includes at least one camera 108, as shown in FIG. 2. The imaging device 98 may further include a light source 110.

Figure 3:
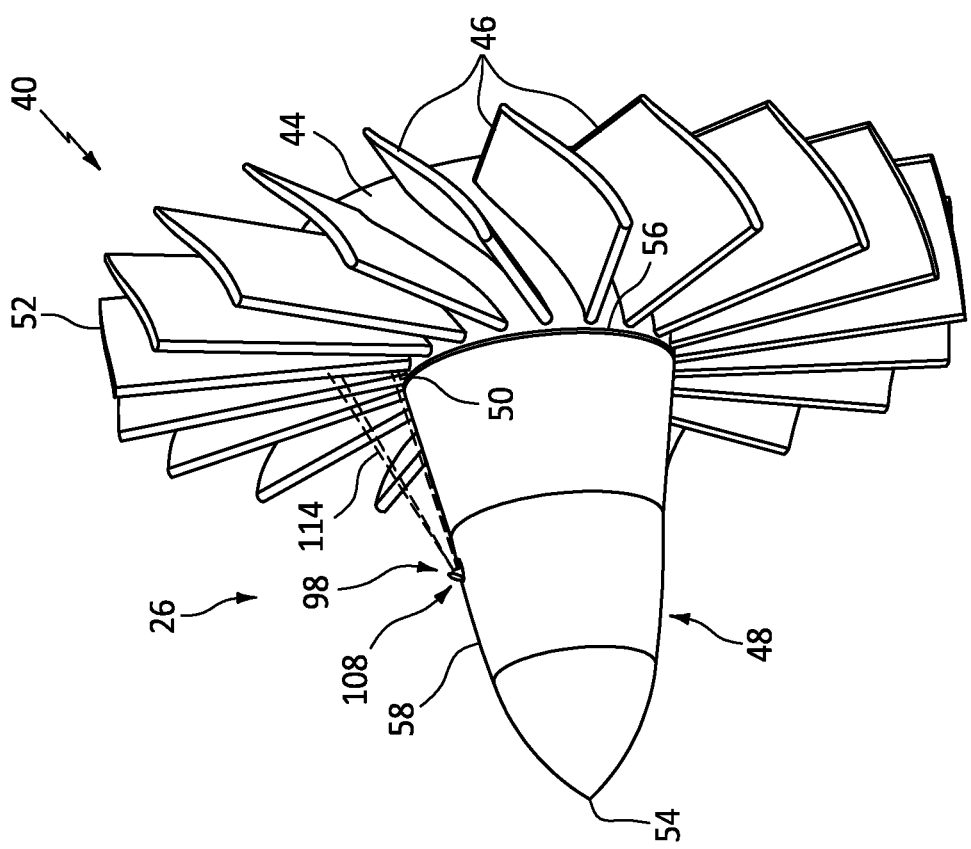
FIG. 3 illustrates a perspective view of a portion of a propulsor blade imaging assembly installed on a propulsor for an aircraft propulsion system, in accordance with one or more embodiments of the present disclosure.

The camera 108 is configured to capture image data of the plurality of propulsor blades 46 as the plurality of propulsor blades 46 rotate with the propulsor disk 44 about the axial centerline 38, and subsequently transmit the capture image data to the controller 96. The camera 108 is configured to capture image data for at least a portion of each of the plurality of propulsor blades 46. For example, the camera 108 of FIG. 2 is configured to capture image data of a radial portion of the plurality of propulsor blades 46 as the plurality of propulsor blades 46 pass through a focused field-of-view of the camera 108. The camera 108 of FIG. 3 is configured with a focused field-of-view (schematically illustrated in FIG. 3 as field-of-view 114 having a field-of-view angle α) directed toward an axially forward side of the plurality of propulsor blades 46 (e.g., toward a leading edge of each of the plurality of propulsor blades 46). For example, the camera 108 of FIG. 2 is configured to capture image data associated with a radial portion of the illustrated propulsor blade 46 at (e.g., on, adjacent, or proximate) the root end 50. The camera 108 may alternatively be configured to capture an entire radial span of the passing plurality of propulsor blades 46 from the root end 50 to the tip end 52. As will be discussed in further detail, the camera 108 has a shutter speed, which shutter speed is representative of a length of time in which a digital image sensor of the camera 108 is exposed to light (e.g., while capturing the image data). The particular shutter speed for the camera 108 may correspond to a rotation speed range of the propulsor 40 at which the camera 108 may be used to capture image data of the plurality of propulsor blades 46. For example, a faster shutter speed of the camera 108 may facilitate the capture of suitable image data of the plurality of propulsor blades 46 for greater rotation speeds of the propulsor 40. The present disclosure, however, is not limited to any particular shutter speed for the camera 108. The imaging device 98 may include a plurality of cameras 108. Each of the plurality of cameras may be positioned with a focused field-of-view of a different portion (e.g., a different radial portion) of the plurality of propulsor blades 46. Accordingly, the plurality of cameras 108 may cooperatively capture image data associated with all or at least a substantial portion of a radial span of the passing plurality of propulsor blades 46.

The light source 110 is configured to direct light (schematically illustrated in FIG. 2 as light vector 112) toward the plurality of propulsor blades 46 to facilitate the capture of image data of the plurality of propulsor blades 46 by the camera 108. The light source 110 may have any suitable lighting configuration conventionally known in the art. The light source 110 may be positioned at (e.g., on, adjacent, or proximate) the camera 108. Alternatively, the light source 110 may be positioned in a discrete location of the propulsor section 28 separated from the camera 108 (e.g., on the propulsor case 42).

FIG. 3 illustrates a perspective view of the propulsor 40 and a portion of an exemplary configuration of the imaging assembly 26. Structural portions of the propulsor section 28 including the propulsor case 42 and the struts 59 have been omitted from FIG. 3 for clarity. As previously discussed, the nose cone 48 is rotationally fixed about the axial centerline 38 (e.g., relative to the propulsor disk 44). The imaging device 98 is disposed on the nose cone 48. For example, the imaging device 98 is disposed at (e.g., on, adjacent, or proximate) the exterior surface 58. The imaging device 98 may be disposed at an intermediate axial position of the nose cone 48 (e.g., axially between and spaced from the leading end 54 and the trailing end 56). The camera 108 of FIG. 3 is configured with the field-of-view 114 directed toward an axially forward side of the plurality of propulsor blades 46 (e.g., toward a leading edge of each of the plurality of propulsor blades 46). The field-of-view 114 of FIG. 3 is directed toward a radial portion of the plurality of propulsor blades 46 at (e.g., on, adjacent, or proximate) the root end 50; however, the present disclosure is not limited to this particular field-of-view. As previously discussed, the exterior surface 58 may radially diverge in a direction from the leading end 54 to the trailing end 56. The divergence of the exterior surface 58 between the imaging device 98 and the trailing end 56 may be linear or substantially linear to facilitate an uninterrupted field-of-view 114 of the camera 108 to the root end 50.

Figure 4:
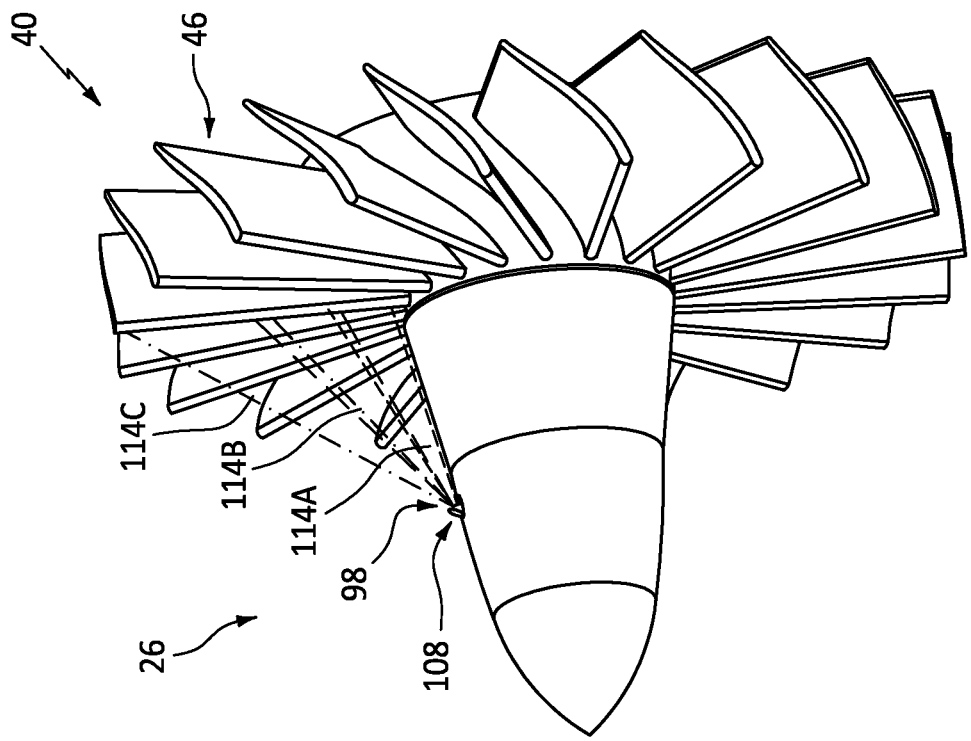
FIG. 4 illustrates a perspective view of a portion of another propulsor blade imaging assembly installed on a propulsor for an aircraft propulsion system, in accordance with one or more embodiments of the present disclosure.

FIG. 4 illustrates a perspective view of the propulsor 40 and a portion of another exemplary configuration of the imaging assembly 26. Structural portions of the propulsor section 28 including the propulsor case 42 and the struts 59 have been omitted from FIG. 4 for clarity. As previously discussed, the nose cone 48 is rotationally fixed about the axial centerline 38 (e.g., relative to the propulsor disk 44). The imaging device 98 includes a plurality of cameras 108 with each camera 108 having a different respective focused field-of-view 114A, 114B, 114C directed toward an axially forward side of the plurality of propulsor blades 46. In other words, each of the cameras 108 is configured to capture image data of a different radial portion of each of the plurality of propulsor blades 46.

During operation of the propulsion system 20 and its gas turbine engine 22 (e.g., during flight), the plurality of propulsor blades 46 may be exposed to foreign objects (e.g., birds, dirt, rocks, loose mechanical fasteners, etc.) which may enter the propulsor section 28 and collide with one or more of the plurality of propulsor blades 46. As a result, one or more of the plurality of propulsor blades 46 may be damaged (e.g., foreign object damage or "FOD"). For example, one or more of the plurality of propulsor blades 46 may include nicks, dents, scratches, tears, and the like caused by a foreign object. Propulsor blades, such as the plurality of propulsor blades 46, which experience foreign object damage may exhibit an increased likelihood of material failure. Inner radial portions of propulsor blades (e.g., at the root end 50) may experience greater steady stress and vibratory stress relative to other portions of the propulsor blades and these inner radial portions may, therefore, be more susceptible to material failure resulting from foreign object damage.

To identify the presence of foreign object damage on propulsor blades, the propulsor blades may be periodically inspected. This inspection process may conventionally be performed manually by an inspector directly visually observing the propulsor blades and feeling the propulsor blades to identify foreign object damage. While this may be a reliable method for identifying foreign object damage, it can require a considerable amount of time, during which time the propulsion system 20 and its gas turbine engine 22 may not be operated. Moreover, this manual inspection process may present an increased likelihood of inspection tools and/or maintenance materials being left inside the gas turbine engine, where they may subsequently be ingested by the gas turbine engine contributing to the risk of foreign object damage.

In operation of the imaging assembly 26, the imaging device 98 (e.g., the camera(s) 108) captures image data of the plurality of propulsor blades 46 and transmits the image data to the controller 96. The memory 104 includes instructions which, when executed by the controller 96 and/or its processor 102, cause the controller 96 and/or its processor 102 to identify the presence or absence of damage (e.g., foreign object damage) for the plurality of propulsor blades 46. Using the image data, the controller 96 may identify a probability that the plurality of propulsor blades 46 or one or more of the plurality of propulsor blades 46 includes damage. The controller 96 may identify damage to the plurality of propulsor blades 46 or one or more of the plurality of propulsor blades 46 if the determined probability exceeds a damage probability threshold. The damage probability threshold may be a predetermined value (e.g., a user input). The instructions may include, for example, a machine learning algorithm to identify the presence of damage or otherwise determine a probability of damage using the image data from the cameras 108. The machine learning algorithm may be trained using historical image data of propulsor blades, which historical image data may include flagged (e.g., manually identified) propulsor blade damage. Alternatively, the instructions may cause the controller 96 to compare the image data from the cameras 108 to reference image data which is representative of the plurality of propulsor blades 46. The controller 96 may compare the image data from the cameras 108 to the reference image data to identify differences which may be indicative of the presence of damage for the plurality of propulsor blades 46. The present disclosure, however, is not limited to any particular algorithm or process for identifying damage using the image data from the cameras 108. The location of the imaging device 98 on the nose cone 48, as previously discussed, positions the camera(s) 108 in closer proximity to the root end 50 of each of the plurality of propulsor blades 46, relative to other portions of the propulsor section 28. Accordingly, the camera(s) 108 may capture clearer and/or higher quality image data for portions (e.g., radial portions) of the plurality of propulsor blades 46 at (e.g., on, adjacent, or proximate) the root end 50 which portions, as previously discussed, may be more susceptible to material failure resulting from foreign object damage.

The controller 96 may control the imaging device 98 (e.g., the camera(s) 108 and/or the light source 110) to capture the image data for the plurality of propulsor blades 46. For example, the memory 104 may include instructions which, when executed by the controller 96 and/or its processor 102, cause the controller 96 to control the imaging device 98 (e.g., the camera(s) 108 and/or the light source 110) to capture the image data for the plurality of propulsor blades 46. The controller 96 may control the imaging device 98 based on a measured or otherwise determined rotation speed of the propulsor 40. For example, the controller 96 may control the imaging device 98 based on the output signal of the shaft speed sensor 100, which output signal may be representative of the rotation speed of the propulsor 40. For embodiments of the gas turbine engine 22 in which the propulsor 40 may be driven by the second shaft 84 via a speed-reducing gear assembly, the rotation speed of the propulsor 40 may be determined by the controller 96 based on a known speed-reduction ratio of the speed-reducing gear assembly.

The controller 96 may control the imaging device 98 to capture the image data for the plurality of propulsor blades 46 when the rotation speed of the propulsor 40 is less than or equal to a rotation speed threshold value (e.g., a predetermined rotation speed value). The rotation speed threshold value may be representative of a rotation speed of the propulsor 40 at or below which the camera(s) 108 may capture image data of the plurality of propulsor blades 46 which is suitable for the controller 96 to identify the presence or absence of damage (e.g., foreign object damage) for the plurality of propulsor blades 46, for example, based on the shutter speed for each camera 108.

Figure 5:
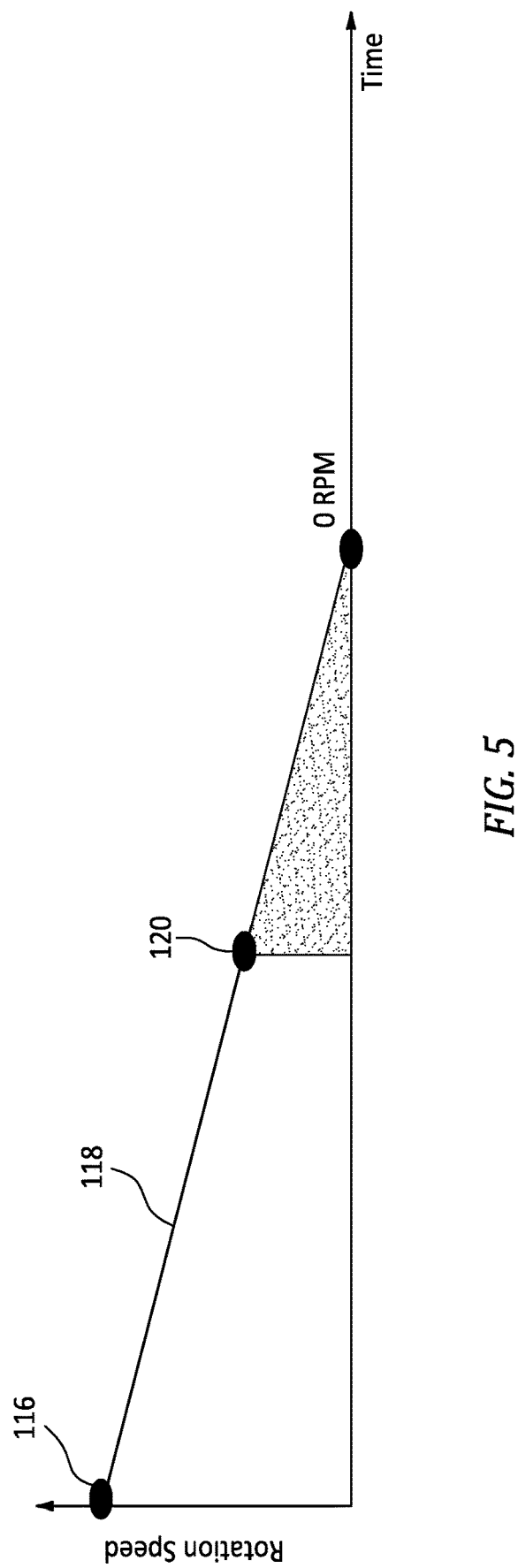
FIG. 5 illustrates an exemplary graph of an aircraft propulsion system propulsor rotation speed during an engine shutdown, in accordance with one or more embodiments of the present disclosure.

The controller 96 may control the imaging device 98 to capture the image data for the plurality of propulsor blades 46 subsequent to shutdown of the propulsion system 20 and/or its gas turbine engine 22 (e.g., when fuel is no longer being supplied to the combustor 64 to drive rotation of the rotational assemblies 70, 72). In other words, the propulsion system 20 may be understood to be in a shutdown condition when the propulsion system 20 is no longer expending energy (e.g., fuel, stored battery energy, etc.) to drive rotation of the propulsor 40 (e.g., using the rotational assemblies 70, 72). FIG. 5 illustrates a graph of propulsor 40 rotation speed vs. time following shutdown of the gas turbine engine 22. A shutdown 116 of the gas turbine engine 22 may occur at Time 0, as shown in FIG. 5. A rotation speed 118 of the propulsor 40 (e.g., based on measurement of the second shaft 84 rotation speed) will gradually decrease toward zero (0) revolutions per minute (RPM) subsequent to the shutdown 116. For ease of understanding, the slope of the rotation speed 118 in FIG. 5 is illustrated as being substantially linear, however, the present disclosure should not be understood to be limited in this regard. The controller 96 may control the imaging device 98 to capture the image data for the plurality of propulsor blades 46 when the rotation speed 118 of the propulsor 40 is less than or equal to a rotation speed threshold value 120. As shown in FIG. 5, the rotation speed threshold value 120 is a rotation speed value greater than zero (0) RPM. The rotation speed threshold value 120 may be less than an initial rotation speed 118 of the propulsor 40 at the shutdown 116. The rotation speed threshold value 120 may be selected such that the captured image data of the plurality of propulsor blades 46 is suitable for analysis by the controller 96, as described above, but provides sufficient time for the capture of the image data of each of the plurality of propulsor blades 46 prior to the propulsor 40 reaching a rotationally stationary condition (e.g., the rotation speed 118 at or approximately at zero (0) RPM). In some embodiments of the propulsion system 20, the imaging assembly 26 or components (e.g., the imaging device 98) of the imaging assembly 26 may receive electrical power from the generator 80 (see FIG. 1). Following the shutdown 116, rotation of the first rotational assembly 70 and the second rotational assembly 72 may gradually decrease to a point at which the generator 80 may no longer be capable of suitably generating electrical power for the imaging assembly 26 or components (e.g., the imaging device 98) of the imaging assembly 26. Accordingly, the rotation speed threshold value 120 may be selected to provide sufficient time for the capture of the image data of each of the plurality of propulsor blades 46 prior to a loss of electrical power by the imaging assembly 26 or components (e.g., the imaging device 98) of the imaging assembly 26. Routine experimentation, simulation, and/or analysis may be performed by a person of ordinary skill in the art to determine suitable a rotation speed threshold value(s) in accordance with and as informed by one or more aspects of the present disclosure. The process for capturing the image data for the plurality of propulsor blades 46 following the shutdown 116, as described above, may generally be performed with the propulsion system 20 in a grounded condition (e.g., with the aircraft on which the propulsion system 20 is installed being on the ground). For example, the controller 96 may initiate the capture of the image data following an aircraft landing procedure, where the gas turbine engine 22 is shutdown during or following aircraft transit on the ground (e.g., taxiing).

The controller 96 may transmit the image data and/or an indication of the identified presence or absence of damage for the plurality of propulsor blades 46 to the offboard system(s) 106. For example, the controller 96 may transmit data to the offboard system(s) 106 indicating that one or more of the plurality of propulsor blades 46 has been identified as being damaged. Receipt of the damage-indicative data by the offboard system(s) 106 may facilitate the scheduling and/or performing of inspections and/or repair for the plurality of propulsor blades 46 (e.g., the damaged one or more propulsor blades of the plurality of propulsor blades 46). Accordingly, aspects of the present disclosure may facilitate a reduction or elimination of periodic manual inspections of the plurality of propulsor blades 46, and inspections and repairs may instead be performed based on in situ identification of damage to the plurality of propulsor blades 46 as identified by the imaging assembly 26.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be in the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses in the scope of the present application even if such embodiments are not expressly disclosed herein. For example, in the exemplary embodiments described above in the Detailed Description portion of the present specification, elements may be described as individual units and shown as independent of one another to facilitate the description. In alternative embodiments, such elements may be configured as combined elements.

The invention claimed is:

1. An assembly for an aircraft propulsion system, the assembly comprising:
a propulsor including a propulsor disk, a plurality of propulsor blades, and a nose cone, the propulsor disk extending circumferentially about a rotational axis, the plurality of propulsor blades circumferentially distributed about the propulsor disk, each propulsor blade of the plurality of propulsor blades extending radially between and to a root end and a tip end, the root end disposed at the propulsor disk, the propulsor disk and the plurality of propulsor blades configured to rotate about the rotational axis, the nose cone disposed axially adjacent the propulsor disk; and
an imaging assembly including an imaging device disposed on the nose cone, wherein the nose cone is rotationally fixed relative to the rotational axis, the imaging device including a camera, the camera configured to capture image data of each propulsor blade of the plurality of propulsor blades as the plurality of propulsor blades rotate about the rotational axis.

2. The assembly of claim 1, wherein the nose cone extends axially between and to a leading end and a trailing end, the trailing end positioned at the propulsor disk, the nose cone forming an exterior surface extending between and to the leading end and the trailing end, the camera positioned at the exterior surface.

3. The assembly of claim 2, wherein the nose cone is positioned axially between and spaced from the leading end and the trailing end.

4. The assembly of claim 3, wherein the exterior surface diverges in a radial direction from the leading end to the trailing end, and divergence of the exterior surface axially between the imaging device and the trailing end is linear.

5. The assembly of claim 1, wherein the camera is configured to capture the image data for a portion of a radial span of each propulsor blade of the plurality of propulsor blades.

6. The assembly of claim 5, wherein the portion is at the root end.

7. The assembly of claim 5, wherein the imaging device includes a plurality of cameras, the plurality of cameras including the camera, and each camera of the plurality of cameras is configured to capture the image data for a different portion of the radial span relative to each other camera of the plurality of cameras.

8. The assembly of claim 1, wherein the imaging assembly further includes a controller connected in signal communication with the imaging device, the controller including a processor in communication with a non-transitory memory storing instructions, which instructions when executed by the processor, cause the processor to:
initiate the capture of the image data by controlling the camera to capture the image data based on a measured rotation speed of the propulsor about the rotational axis.

9. The assembly of claim 8, wherein the instructions, when executed by the processor, further cause the processor to initiate the capture of the image data by controlling the camera to capture the image data based on the measured rotation speed when the measured rotation speed is less than or equal to a predetermined rotation speed threshold value.

10. The assembly of claim 9, wherein the predetermined rotation speed threshold value is greater than zero (0) RPM.

11. The assembly of claim 8, wherein the instructions, when executed by the processor, further cause the processor to identify a presence or an absence of damage for each propulsor blade of the plurality of propulsor blades using the image data.

12. The assembly of claim 11, wherein the instructions, when executed by the processor, further cause the processor to transmit to an offboard system an indication of identification of the presence of damage to at least one propulsor blade of the plurality of propulsor blades.

13. A propulsion system for an aircraft, the propulsion system comprising:
a gas turbine engine comprising a rotational assembly and a propulsor, the rotational assembly including a shaft rotatable about a rotational axis, the propulsor including a plurality of propulsor blades and a nose cone, the plurality of propulsor blades configured to be driven by the shaft for rotation about the rotational axis, the nose cone rotationally fixed relative to the rotational axis; and
an imaging assembly including an imaging device disposed on the nose cone, the imaging device including a camera, the camera configured to capture image data of each propulsor blade of the plurality of propulsor blades as the propulsor blades rotate about the rotational axis.

14. The propulsion system of claim 13, wherein the imaging assembly further includes a controller connected in signal communication with the imaging device, the controller including a processor in communication with a non-transitory memory storing instructions, which instructions when executed by the processor, cause the processor to:
initiate the capture of the image data by controlling the camera to capture the image data based on a rotation speed of the shaft about the rotational axis.

15. The propulsion system of claim 14, wherein the imaging assembly further includes a shaft speed sensor configured to measure the rotation speed of the shaft, generate an output signal proportional to the measured rotation speed, and transmit the output signal to the controller.

16. The propulsion system of claim 14, wherein the gas turbine engine further includes a generator, the generator configured to generate and direct electrical power to the imaging assembly.

* * * * *